US007585241B2

(12) United States Patent
Tamba et al.

(10) Patent No.: US 7,585,241 B2
(45) Date of Patent: Sep. 8, 2009

(54) DECOUPLER

(75) Inventors: Richard Terence Tamba, NSW (AU);
Mariusz Dudzik, NSW (AU); Stephen Tapper, NSW (AU); Paul Anthony Donnelly, NSW (AU); Dennis Albert Rumble, NSW (AU); Graham Charles Mowbray, NSW (AU)

(73) Assignee: Nautitech Pty Ltd., Castle Hill, New South Wales (AU)

( * ) Notice: Subject to any disclaimer, the term of this patent is extended or adjusted under 35 U.S.C. 154(b) by 0 days.

(21) Appl. No.: 11/572,488

(22) PCT Filed: Jul. 23, 2004

(86) PCT No.: PCT/AU2004/000986

§ 371 (c)(1),
(2), (4) Date: Apr. 9, 2007

(87) PCT Pub. No.: WO2005/102836

PCT Pub. Date: Nov. 3, 2005

(65) Prior Publication Data
US 2007/0218786 A1     Sep. 20, 2007

(51) Int. Cl.
*F16H 47/08* (2006.01)
(52) U.S. Cl. .......................................... 475/53; 475/59
(58) Field of Classification Search .................. 475/47, 475/53, 59, 70
See application file for complete search history.

(56) References Cited

U.S. PATENT DOCUMENTS

| 3,822,770 | A | * | 7/1974 | Golan ..................... 192/103 F |
| 4,887,984 | A | * | 12/1989 | Newman ...................... 440/86 |
| 5,018,996 | A | * | 5/1991 | Newman et al. .............. 440/75 |
| 5,341,703 | A | * | 8/1994 | Palansky et al. .............. 477/65 |
| 5,474,480 | A | | 12/1995 | Schwarz et al. |
| 5,601,506 | A | * | 2/1997 | Long et al. .................. 475/120 |
| 5,700,219 | A | * | 12/1997 | Ohkubo ....................... 475/47 |
| 5,957,799 | A | * | 9/1999 | Kashiwase ................... 475/47 |
| 6,302,227 | B1 | | 10/2001 | Takemura et al. |
| 6,435,998 | B1 | * | 8/2002 | Sudau et al. .................. 475/47 |
| 6,979,275 | B2 | * | 12/2005 | Hiraku et al. ............... 475/214 |

FOREIGN PATENT DOCUMENTS

| DE | 10005538 | 8/2001 |
| GB | 2367598 | 4/2002 |
| WO | WO/97/03876 | 2/1997 |
| WO | WO/00/38981 | 7/2000 |
| WO | WO/02/085703 | 10/2002 |

* cited by examiner

*Primary Examiner*—Ha D. Ho
(74) *Attorney, Agent, or Firm*—Townsend and Townsend and Crew, LLP

(57) ABSTRACT

A decoupler 10 having a rotatable input member 12 for coupling to a drive unit 13 and a rotatable output member 28 for coupling to an output drive, and a gear set 34 for transmitting drive from the rotatable input member 12 to the rotatable output member 28, wherein the decoupler 10 is operable to selectively isolate an input gear 36 of the gear set 34 from driving connection with the drive unit 13, and to selectively engage the input gear 36 into driving connection with the drive unit 13. The invention also relates to a method of transmitting torque and to a method of installing the decoupler 10.

13 Claims, 16 Drawing Sheets 2 speed decoupling clutch

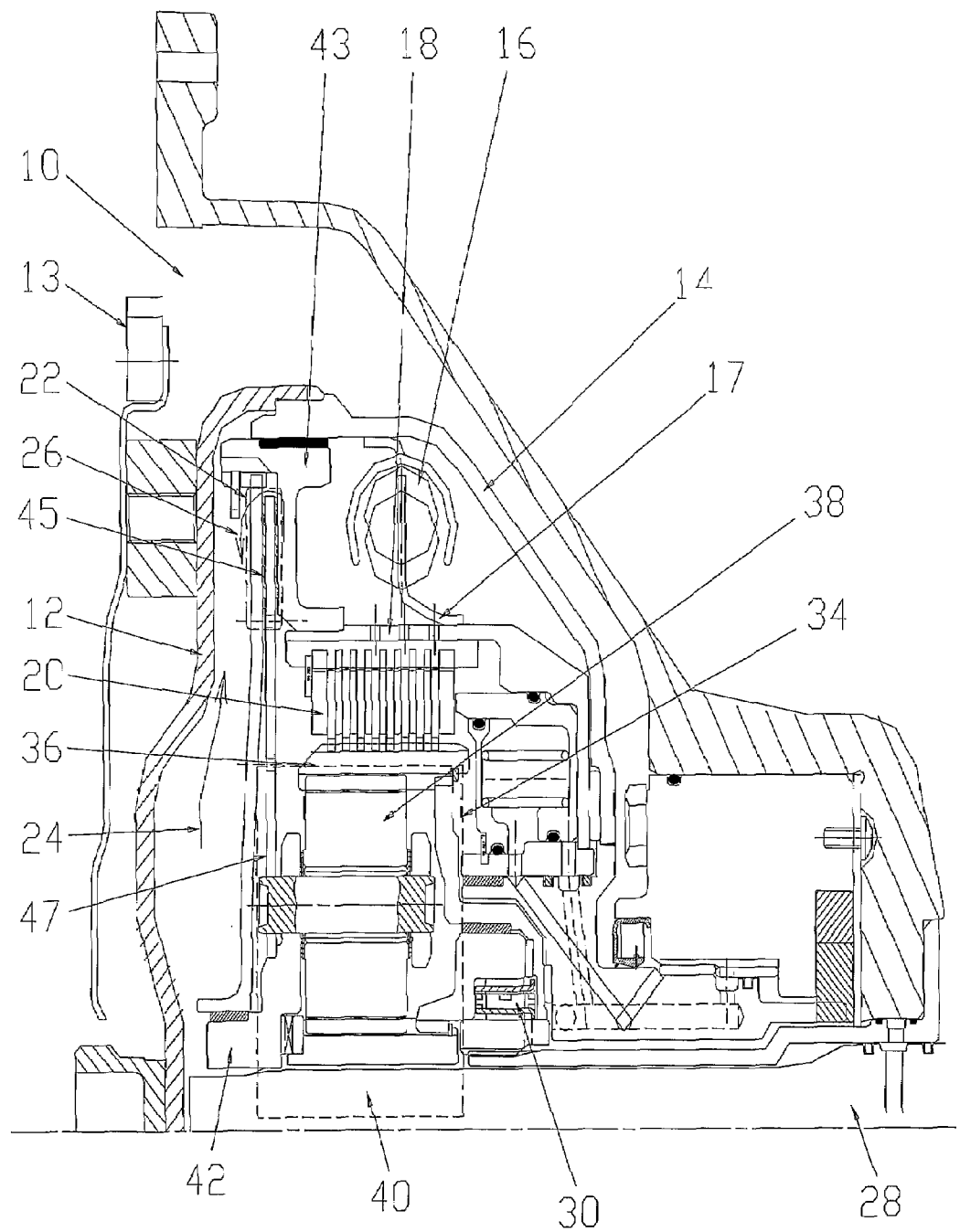
Figure 1a: 2 speed decoupling clutch

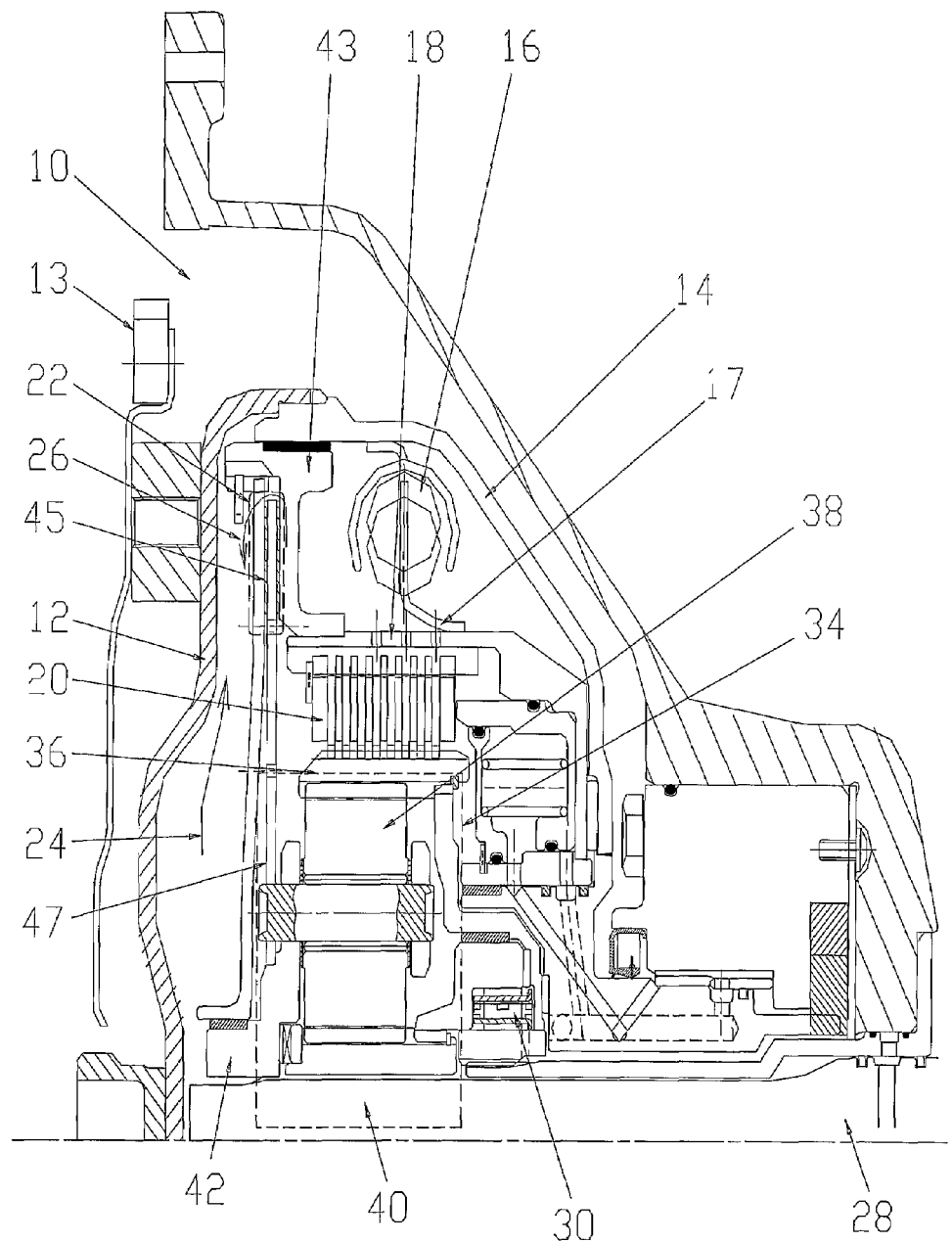
Figure 1b 2 speed decoupling clutch
Without starting clutch

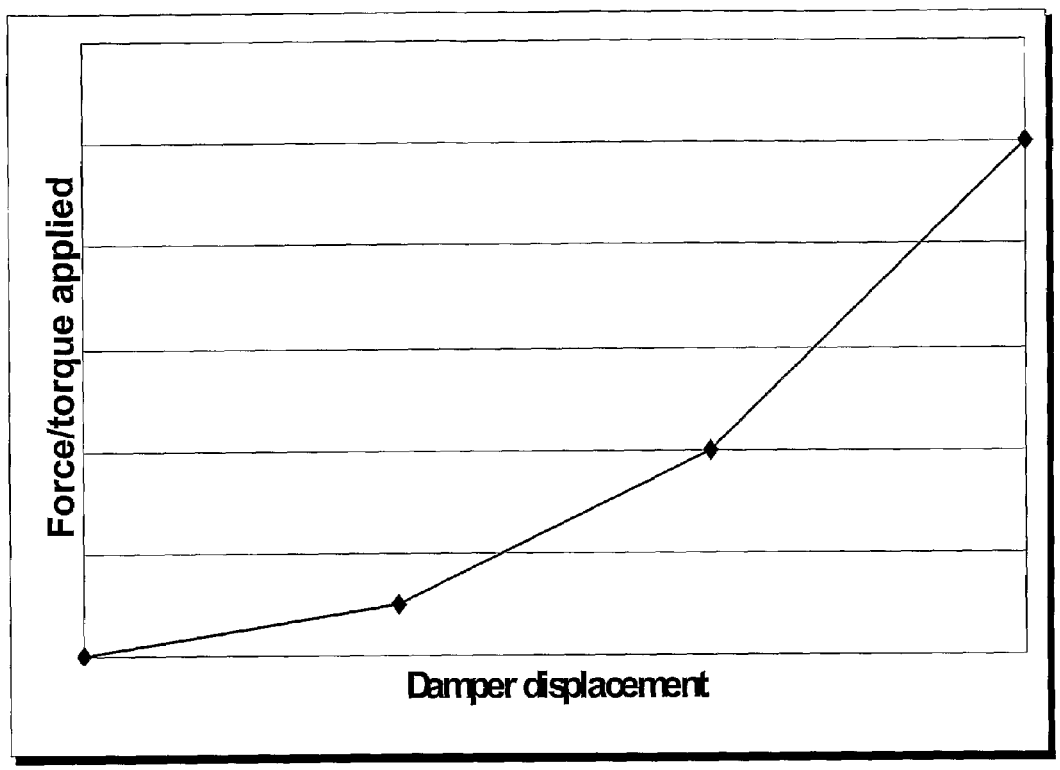
Figure 2: Graph of force versus displacement for damper

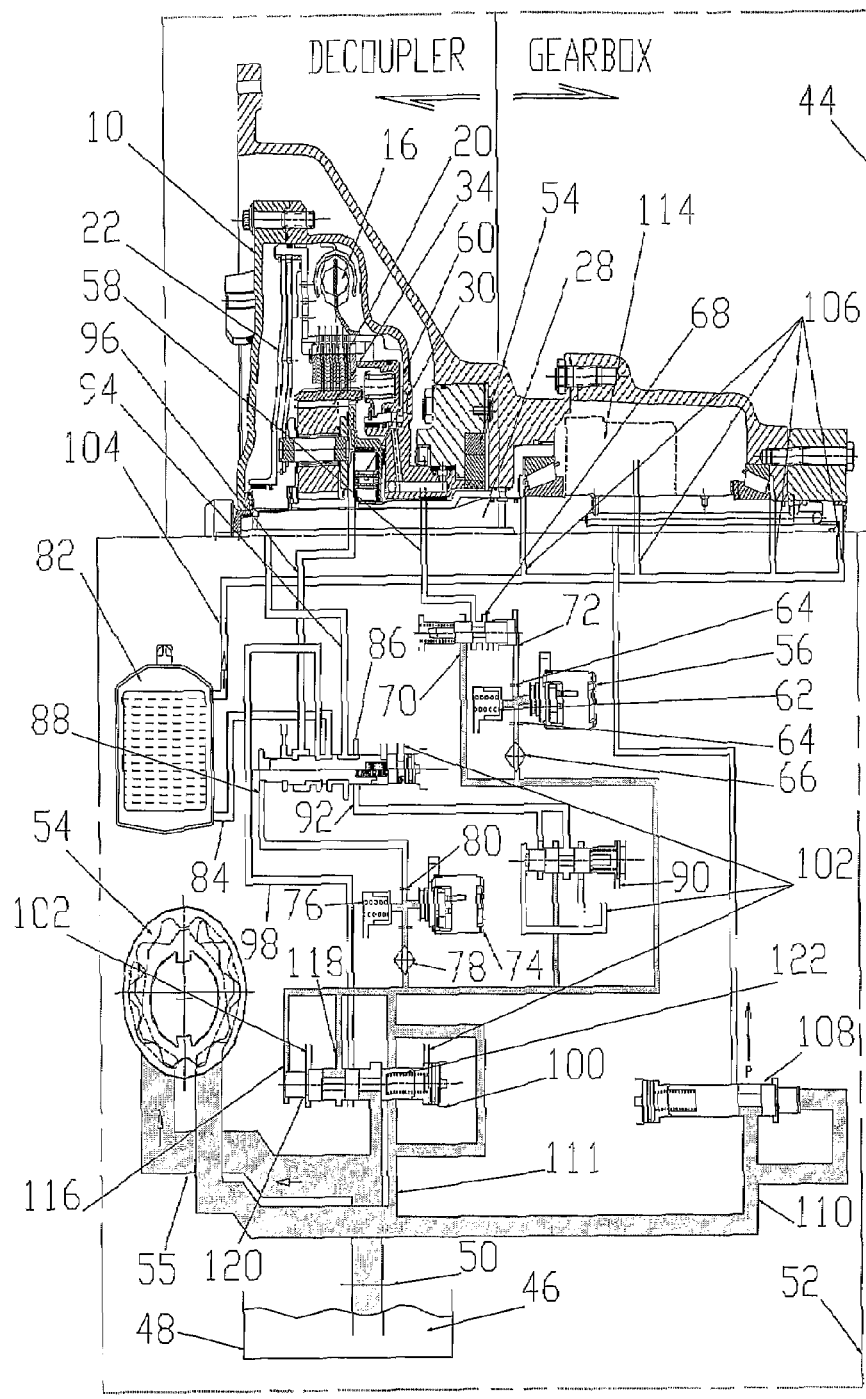
Figure 3: Hydraulic schematic of decoupler

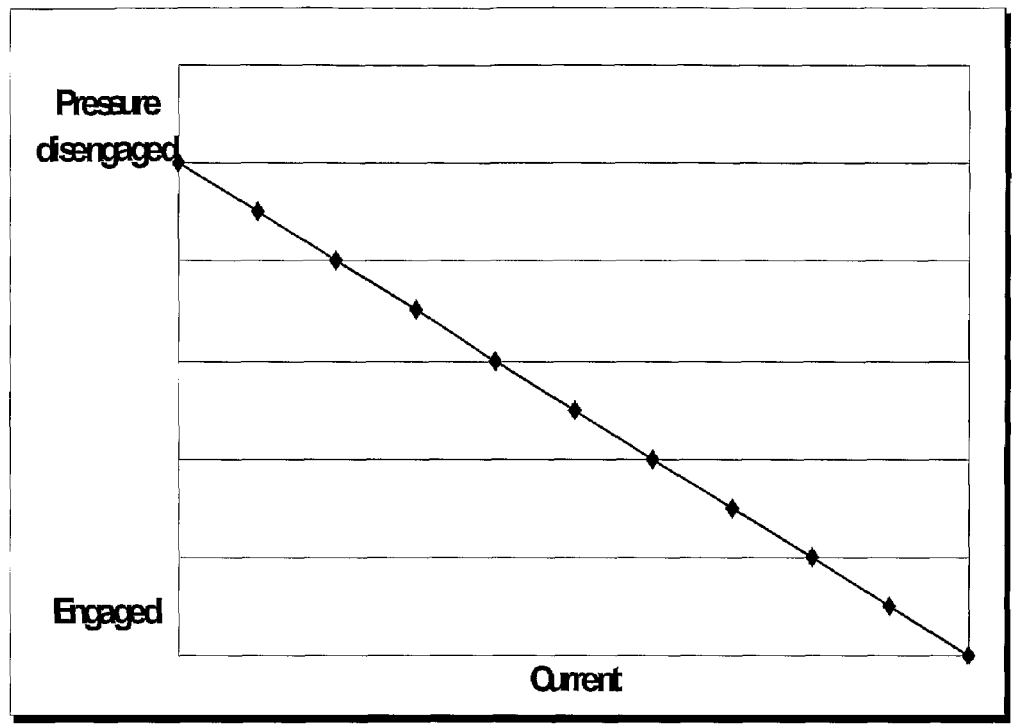
Figure 4a: Pressure versus current for a normally high solenoid

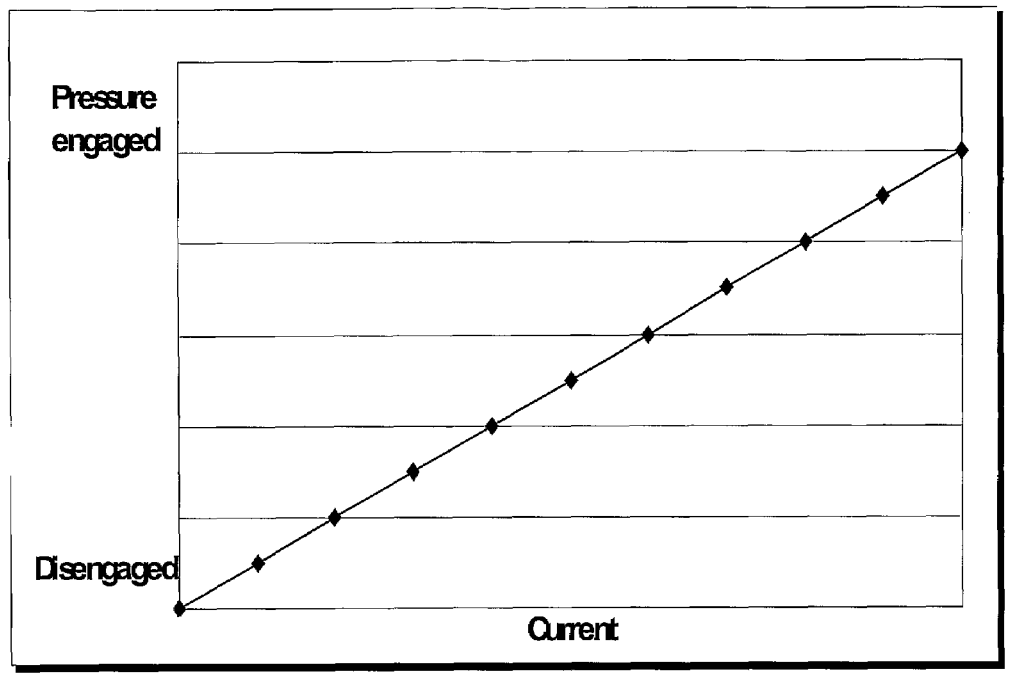
Figure 4b: Pressure versus current for a normally low solenoid

TYPE A

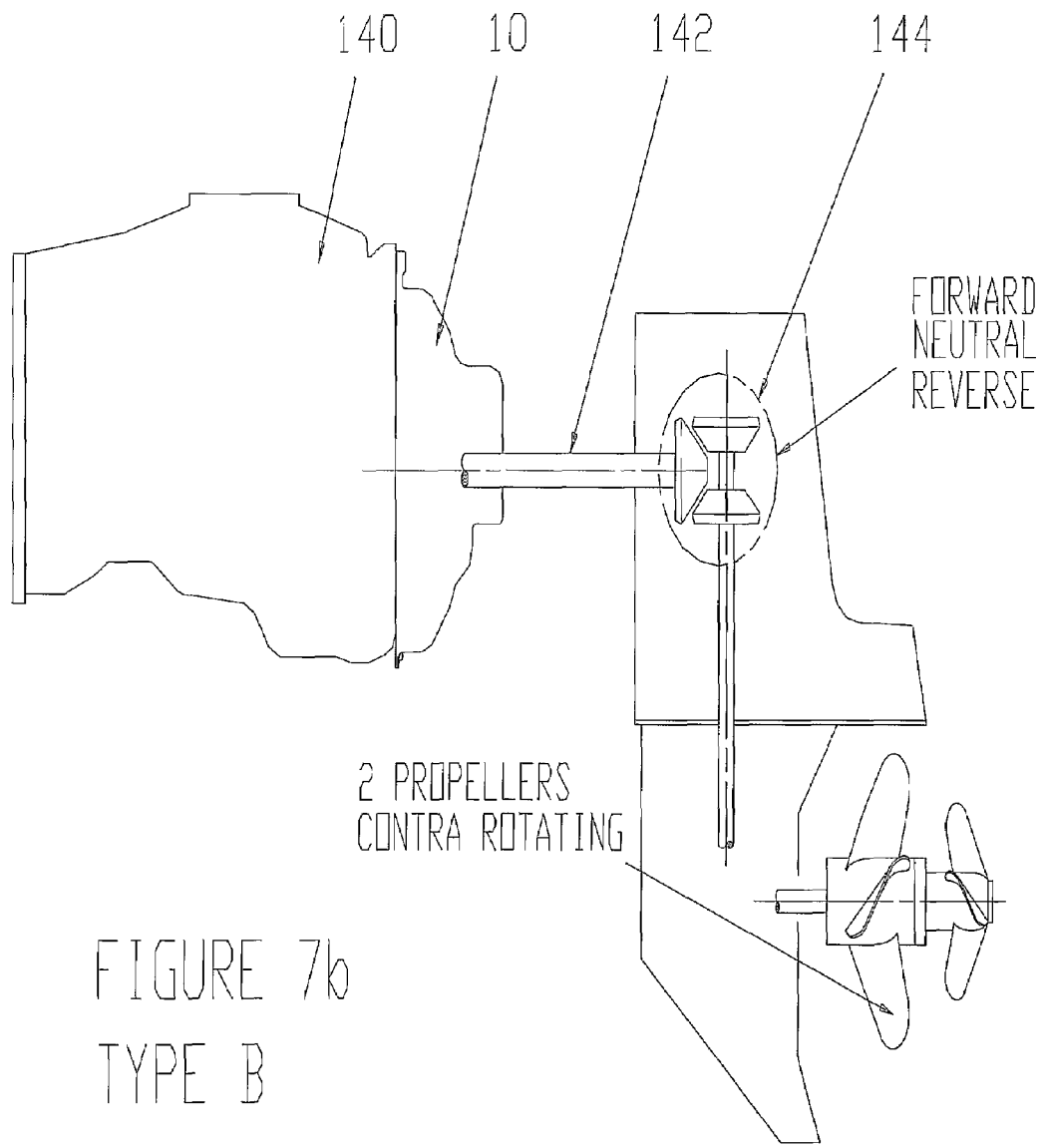

TYPE C

FIGURE 9: Hydraulic hybrid system containing a decoupler

FIGURE 10: Electric Hybrid

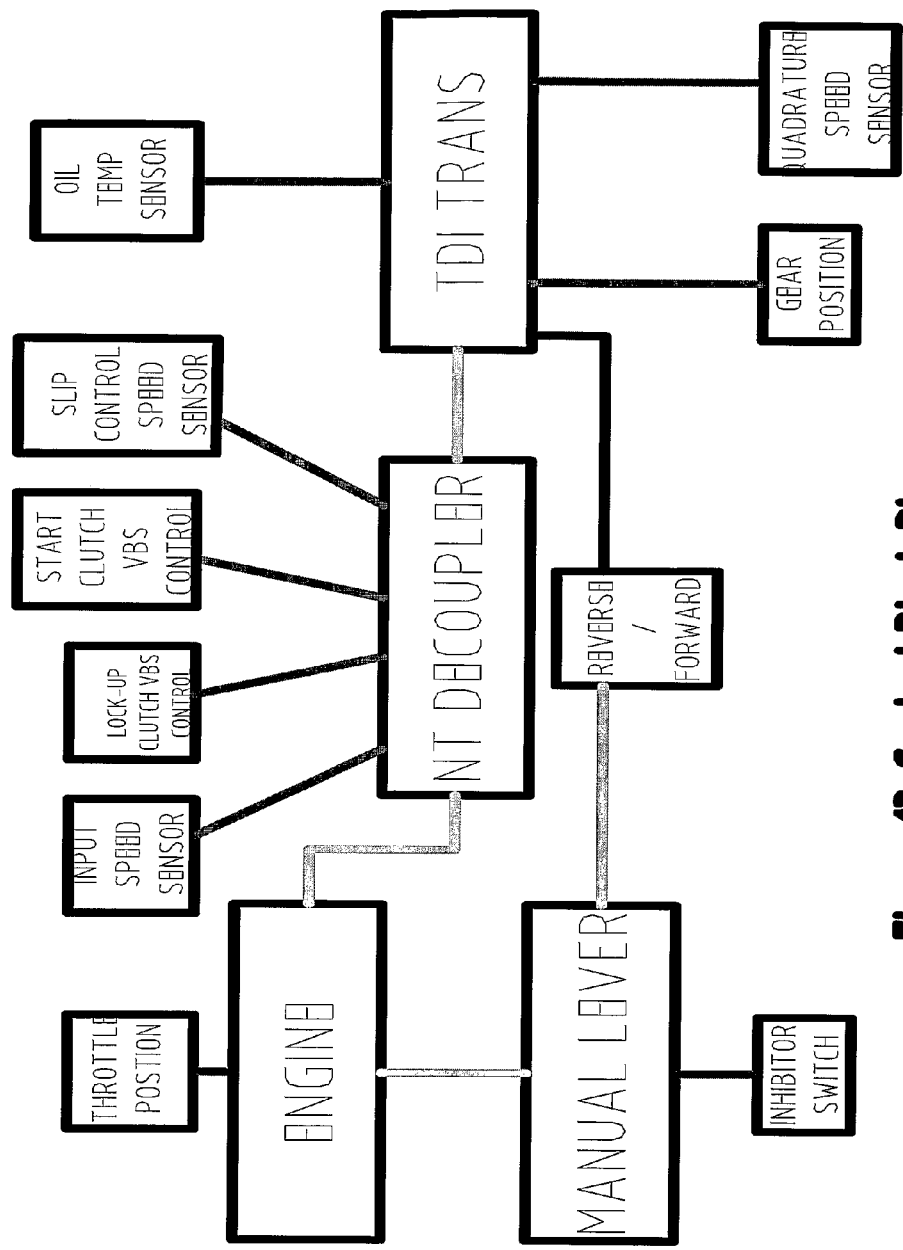
Figure 13: Control Block Diagram

DECOUPLER

FIELD OF THE INVENTION

This invention relates to a decoupler. More particularly, but not exclusively, the invention relates to a decoupler incorporating a multi-speed transmission.

SUMMARY OF THE INVENTION

In accordance with one aspect, there is provided a decoupler with a housing for a clutch arranged to selectively isolate drive from an input member of the decoupler to a rotatable output member, wherein the input member forms part of the housing.

In accordance with another aspect there is provided a decoupler configured for operation within a bell-housing mounted to an engine of a watercraft, the decoupler having a rotatable input member for coupling to an output of the engine, a rotatable output member for coupling to a drive train of the watercraft, and a clutch for transmitting drive from the rotatable input to the rotatable output member, wherein the decoupler is operable to selectively isolate the rotatable output member from driving connection with the rotatable input member and to selectively engage the rotatable output member into driving connection with the rotatable input member.

In accordance with another aspect there is provided a decoupler including a clutch within a housing, configured for transmitting drive between an engine and a drivetrain, wherein the housing is adapted for direct connection to a rotatable output of the engine.

In accordance with another aspect there is provided a decoupler configured for transmitting drive between an engine and a drivetrain, wherein the decoupler has a sealed housing adapted for coupling to a rotatable output of the engine, a rotatable output member for coupling to the drivetrain, a clutch for transmitting drive from the decoupler housing to the rotatable output member, and a damper mounted within the decoupler housing for transmitting drive from the decoupler housing to the clutch.

In accordance with another aspect there is provided a decoupler configured for transmitting drive between the engine of a vehicle and a drivetrain of the vehicle, wherein the decoupler has a housing adapted for coupling to a rotatable output of the engine, an output member adapted for coupling to the drivetrain, an input part coupled directly to the housing by a damper, a first clutch engageable between the input part and a planetary gear set for transmitting drive from the input part to the output member at a first ratio, and a second clutch engageable between the input part and the output member for transmitting drive from the input part to the output member at a second ratio.

In accordance with another aspect there is provided a decoupler having shell portions for housing a gear set, a rotatable input member for coupling to a drive unit and a rotatable output member for coupling to an output drive, the gear set being for transmitting drive from the rotatable input member to the rotatable output member, wherein the decoupler is operable to selectively isolate an input gear of the gear set from driving connection with the drive unit, and to selectively engage the input gear into driving connection with the drive unit, and wherein the input member forms one of the shell portions of the decoupler.

In accordance with another aspect there is provided a method of installing a decoupler, including the steps of:

providing a decoupler having shell portions for housing a gear set;

coupling one of the shell portions to a drive unit of an existing drive train such that said one of the shell portions forms an input of the decoupler; and coupling an output of the decoupler to an output drive of the drive train.

In accordance with another aspect there is provided a method of transmitting torque from a drive unit to an output drive via a transmission, including the steps of:

providing the transmission in the form of a decoupler having shell portions for housing a gear set including first and second input gears;

coupling one of the shell portions for fixed rotation relative to an output of the drive unit;

engaging the first input gear of the transmission in driving interconnection with said one shell portion, the first input gear being in driving connection with the output drive;

isolating the first input gear of the transmission from driving interconnection; and engaging the second input gear of the transmission in driving interconnection with said one shell portion, the second input gear being in driving connection with the output drive.

BRIEF DESCRIPTION OF THE DRAWINGS

The invention is described, by way of non-limiting example only, with reference to the accompanying drawings in which:

FIG. 1a is a diagrammatic sectional side view of part of a drive decoupler;

FIG. 1b is a diagrammatic sectional side view of part of a single clutch 2 speed drive part of a drive decoupler;

FIG. 2 is a diagrammatic graph of force/torque applied versus damper displacement for a damper of the drive decoupler;

FIG. 3 is a diagrammatic sectional side view of a drive decoupler coupled to a forward-neutral-reverse transmission, also showing a basic illustration of a hydraulic control system of the drive decoupler and transmission;

FIG. 4a is a diagrammatic graph of pressure versus current for a normally high variable bleed solenoid of the control system of FIG. 3;

FIG. 4b is a diagrammatic graph of pressure versus current for a normally low variable bleed solenoid of the control system of FIG. 3;

FIG. 7b is a diagrammatic sketch of a drive decoupler as used in a stern drive transmission, herein called type B, inboard motor arrangement for watercraft;

FIG. 13 is a block diagram of a Control Area Network (CAN) incorporating a drive decoupler.

DETAILED DESCRIPTION

Figure 5:
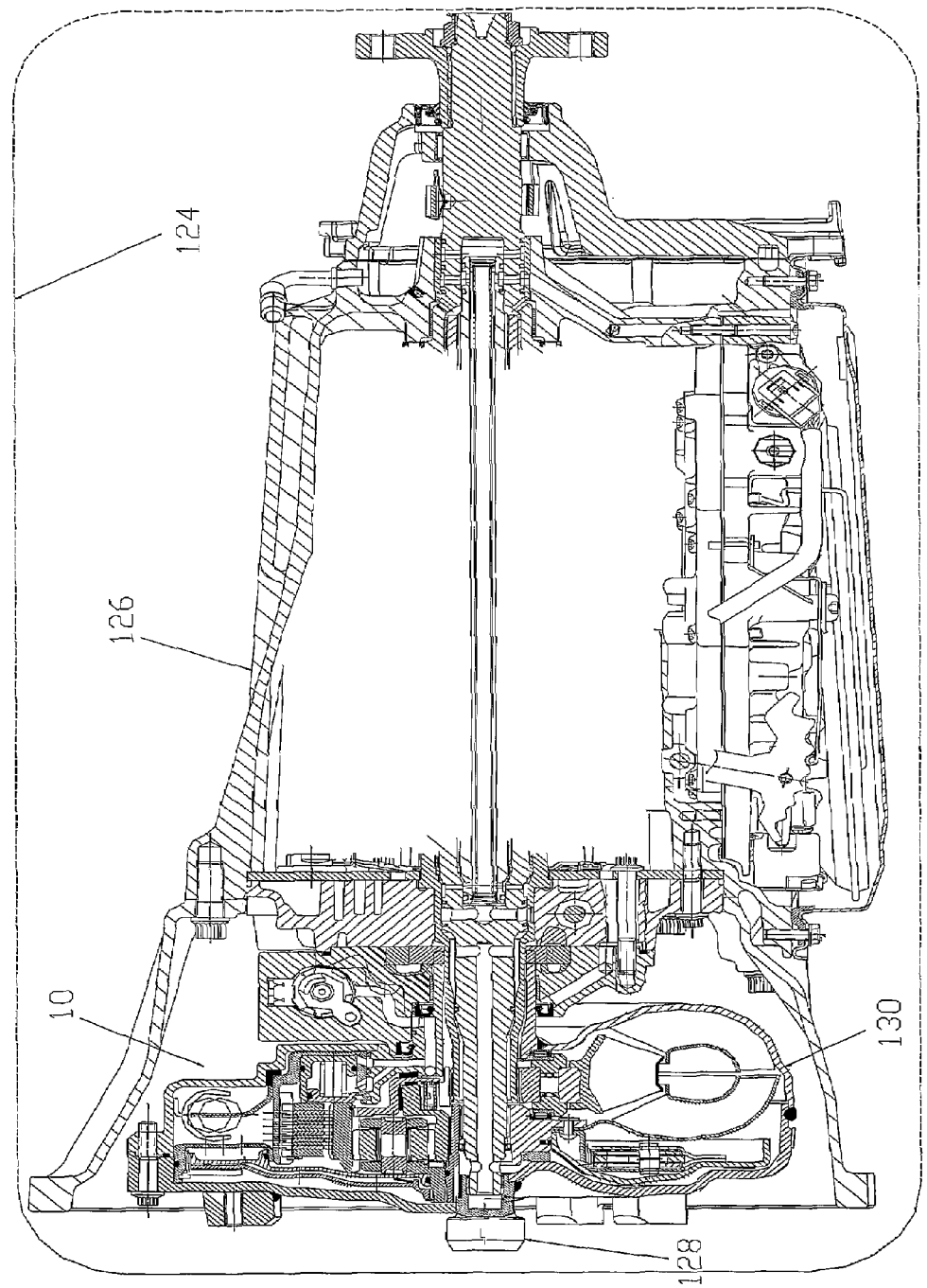
FIG. 5 is a diagrammatic sectional side view of a drive decoupler as used in combination with a 6 speed automatic transmission.

A decoupler 10 (refer FIG. 1a) for mounting between a drive unit and an output drive has a damper 16 for absorbing pulses and unwanted vibrations and two clutches 20, 22 for controlling coupling between the drive unit and the output drive at two different drive ratios. A high (low-range) ratio is achieved by transmitting drive through a start-up clutch 20 and a planetary gear set 34, and a direct 1:1 ratio is achieved by transmitting drive through a lockup clutch 22.

In the example shown, the decoupler 10 has a front shell portion 12 which is attached to an engine (not shown), for example by way of the front shell portion 12 being rigidly bolted to a fly-wheel of the engine (part of which is indicated by reference numeral 13), such that the front shell portion 12 rotates with the fly-wheels. The front shell portion 12 is coupled to a rear shell portion 14 of the decoupler 10 such that rotation of the front shell portion 12 is transferred to the rear shell portion 14 of the decoupler 10. The front and rear shell portions 12, 14 together form a housing of the decoupler 10. Rotation of the front shell portion 12 is also transferred to a damper 16 mounted to a disc 17 such that the disc 17 is driven by the engine. The disc 17 is connected to an input 18 of the start-up clutch 20 such that the clutch input 18 is also driven by the engine. The damper 16 comprises a spring or the like to provide resilient movement between the rear shell portion 14 and the clutch input 18 such that unwanted resonance and pulses from firing of individual pistons of the engine have a reduced effect on the clutch input 18, and thus on the downstream driveline of a vehicle to which the decoupler 10 is fitted.

Hydraulic fluid flows through the inside of the decoupler 10 to engage and disengage the start-up clutch 20 and lockup clutch 22, as required. More particularly, the fluid is pumped around the inside of the decoupler 10 in the direction indicated by arrow 24 when the lockup clutch 22 is to be engaged, and is pumped in the direction indicated by arrow 26 when the lockup clutch 22 is to be disengaged. Although the start-up clutch 20 and the lockup clutch 22 are each associated with different ratios between an input member of the decoupler 10 (ie. the front shell portion 12) and an output member of the decoupler 10 (output shaft 28), both clutches 20, 22 are able to be engaged at the same time by virtue of the inclusion of a one way clutch 30 operable in series with the start-up clutch 20. The input is through the ring gear 36, the one way clutch 30 holds the sun 40, and the output is through the planetary gear carrier 42. The clutch disc in clutch pack 22 rotates with the planetary gear carrier 42. When clutch 22 is applied, it and the planetary gear carrier 42 rotate with the front shell portion 12 and the ring gear 36, such that these components together with the rear shell portion 14 all rotate at the speed of the engine speed. As these two elements rotate together, the one way clutch will over-speed and the output will be 1:1. It will be obvious to a learned individual that by changing the connections between the drive elements and the components of the gearset different ratios can be achieved.

In the example shown, the output shaft 28 is driven by the startup clutch 20 at a ratio of 1.47:1 such that the output shaft 28 rotates slower than the front shell portion 12 when driven through the start-up clutch 20, and the output shaft 28 is driven by the lockup clutch 22 at a ratio of 1:1 such that the output shaft 28 rotates at the same speed as the front shell portion 12 when driven through the lockup clutch 22. In this way, the decoupler 10 achieves a first gear (ie, when the output shaft 28 is driven by the start-up clutch 20) and a second gear (ie. when the output shaft 28 is driven by the lockup clutch 22). By virtue of the inclusion of the one way clutch 30, both the start-up clutch 20 and the lockup clutch 22 may be engaged at the same time, in which case the decoupler 10 operates in the second gear by virtue of the one way clutch 30 allowing the sun gear 40 to rotate freely in one direction relative to the output shaft 28. In another example of a decoupler 10 (FIG. 1b) the start-up clutch 20 may be omitted thus reducing the length of the unit. The drawback with not having a start clutch 20, obviously, is some loss of function (for example, low speed slip).

An advantage of the system described is that the decoupler (FIG. 1a) can disengage the start-up clutch when the vehicle is stopped and the brake is on. In this way the engine is unloaded, which means fuel is saved, and emissions are reduced. (This could also be achieved within the transmission of the decoupler.)

The damper 16 is tuned according to the speeds and torques to which the decoupler 16 is subjected. In one particular example of decoupler 10, the damper 16 includes various component damper springs having different rates and arranged in series such that compression of the softest spring occurs first (ie. at relatively low torques), whereas the harder component springs require a greater torque to be applied in order for them to be compressed. In this way, the damper 16 can be tuned to different speeds/torques, for example as depicted in the graphical representation of damper displacement versus force/torque (see FIG. 2). In a common type of marine drive transmission having a damper, the damper is made of rubber (for example in the form of a generally cylindrical rubber spring) as the damper is exposed to weather and thus non-metallic material is preferable to avoid corrosion. However in the present decoupler, the damper 16 is advantageously mounted internally of the decoupler and is surrounded by hydraulic fluid such that it is protected from oxidation. As such, the damper 16 may take other forms such as, for example, a coil spring.

The lower gear ratio of first gear of the decoupler 10 is provided by way of the planetary gear set 34 acting between the start-up clutch 20 and the output shaft 28. More particularly, in the example shown, the input 18 of the start-up clutch 20 is connected by way of clutch plates of the start-up clutch 20 to the output 36, which is the ring gear of the planetary gear set 34. The ring gear 36 is in toothed engagement with a set of planetary gears 38 of the planetary gear set 34, which planetary gears 38 are also in toothed engagement with the sun gear 40 of the planetary gear set 34. The planetary gears 38 are mounted on the planetary gear carrier 42 which is rotatable about the axis of the output shaft 28. The planetary gear carrier 42 is coupled to the output shaft 28.

The one way clutch 30 may be of various types. For example, the one way clutch 30 may be a "sprag" type one way clutch, a ratchet type one way clutch, or a one way clutch which uses a series of sprung balls to engage between an outer rotatable member of the clutch and an inner ratchet-shaped rotatable member. Such one way clutches are known and will not be described herein in detail.

FIG. 3 shows another example of a decoupler 10, this time used in conjunction with a forward-neutral-reverse transmission 44 and is divided into an upper part and a lower part. The upper part shows a sectional representation of an upper half only of the decoupler 10 mated to the transmission 44, and the lower part provides a diagrammatic representation of a control system 52 for controlling the decoupler 10 and transmission 44.

The type of configuration shown in FIG. 1a/1b may be used, for example, in watercraft. More particularly, this type of configuration is seen as being especially suitable for use in watercraft having stern-drive type, V-type drive, Shaft-type drive, Surface-type drive or Jet-type drive, all of which types of drive for watercraft are known in general and will not be described herein in detail. The applicant has determined that the decoupler 10 is particularly suitable for mounting between an engine and transmission of a motor-driven watercraft, particularly where the transmission has only a single forward speed, as the decoupler serves to multiply the number of speeds of the transmission.

The decoupler 10 as depicted in FIG. 1a also serves to prevent or at least reduce the effect of torque interrupt during gear changes of the transmission, by selective engagement/disengagement of the start-up clutch 20 and lockup clutch 22. More particularly, by ensuring that the output shaft 28 is in constant driven connection with the drive unit during gear changes by way of simultaneously ramping on one clutch 20, 22 as the other clutch 22, 20 is ramped off, and also by use of the one way clutch 30, interruptions in torque transmission between the drive unit and the output shaft 28 are avoided or reduced, Selective engagement/disengagement of the start-up clutch 20 and lockup clutch 22 also enables the decoupler 10 to prevent or at least reduce the effect of "clunking" during gear changes of the transmission, as the clutches 20, 22 are brought into engagement gradually through a phase of controlled slippage to avoid abrupt changes in speed of the clutch components. This can be achieved through either open or closed loop control. Clunking is an issue mainly in transmissions having dog clutches which typically provide abrupt changes between forward, neutral and reverse gears.

The control system 52 has a sump 48 from which hydraulic fluid is pumped via pump 54 through a network of hydraulic lines in which valves are used for controlling clutch operation of the decoupler 10 and changes between forward-neutral-reverse gears of the transmission 44. The network of hydraulic lines also includes lines for providing lubrication to the decoupler and transmission 44.

More particularly, hydraulic fluid 46 resides in the sump 48 from where it is is pumped through a filter 50 to various parts of the hydraulic control system 52. The hydraulic lines of the system 52 shaded in FIG. 3 represent those parts which permanently receive hydraulic fluid at line pressure during operation of the decoupler 10. Line pressure is provided by the pump 54 which receives the hydraulic fluid from the sump 48 via a suction line 55 and pressurises the fluid for delivery to components of the hydraulic control system 52. The pump 54 is shown in its actual location in the sectional diagram of the decoupler 10 at the top of FIG. 3 as being driven by the output shaft 28 of the decoupler. In alternative examples, the pump 54 may take other forms, for example an electro-hydraulic pump, or a pump within the forward-neutral-reverse transmission 44, a pneumatic actuation source, or similar.

Hydraulic fluid at line pressure is supplied to a first Variable Bleed Solenoid (VBS) 56 or other electro-hydraulic solenoid for controlling engagement/disengagement of the start-up clutch 20. VBS 56 controls flow of hydraulic fluid along hydraulic line 58 which leads to a chamber 60 in which pressure from the hydraulic fluid causes the start-up clutch 20 to engage by pressing together the plates of the start-up clutch 20. In the absence of pressure from the hydraulic fluid in the chamber 60, the start-up clutch 20 is disengaged. Slippage of the start-up clutch 20 is controlled by the VBS 56 which is able to maintain pressure in line 58 and chamber 60 at a level corresponding to a desired level of slip between disengaged and engaged conditions, as shown in FIG. 4a. In this way, full range control of the start-up clutch 20 is provided, VBS 56 is of a "Normally High" type such that, in the case of a power failure (and an absence of current fed to the VBS 56), it reverts to its "High" pressure state, such that the start-up clutch 20 is engaged to provide a "limp-home" feature of the decoupler 10 wherein drive is still able to be transmitted through the decoupler. An accumulator 62 is provided adjacent the VBS 56 to stop hammer in the feed pressure. Baffles 64 are also provided on either side of the VBS to tune the VBS, and also to reduce fluctuations in line pressure. A thimble filter 66 for filtering matter such as metal bits from the hydraulic fluid is also provided upstream of the baffles 64. A spring-biased valve 68 has line pressure applied to one end 70 and pressure from the VBS 56 applied to the other end 72, and is controlled by the difference in these pressures. By using this valve 68, flow of hydraulic fluid into line 58 and chamber 60, and thus engagement/disengagement of the start-up clutch 20, is controlled by the VBS 56.

A similar VBS 74 or other electro-hydraulic solenoid with associated accumulator 76, thimble filter 78, and baffles 80 provides full range control of engagement/disengagement of the lockup clutch 22. VBS 74 also controls flow of hydraulic fluid to a cooler 82 along line 84. This control is performed by utilising valve 86 which receives pressure from the VBS 74 at one end 88 and pressure from an apply limit regulator 90 at an opposite end 92. The valve 86 operates in response to the difference in these pressures to control the flow of hydraulic fluid along line 96 to engage the lockup clutch 22 by flow of hydraulic fluid in the direction of arrow 26 which presses together plates of the lockup clutch 22, and also to control the flow of hydraulic fluid along line 94 to disengage the lockup clutch 22 by flow of hydraulic fluid in the direction of arrow 24 which allows the plates of the lockup clutch 22 to come apart. The VBS 74 is of a "Normally Low" type as represented in FIG. 4b such that, in the event of a power failure, the VBS 74 reverts to a "Low" pressure condition in which the lockup clutch 22 is disengaged. The VBS 74 is able to maintain pressure at levels in between "High" and "Low" states which correspond to engaged and disengaged states of the lockup clutch 22, respectively, such that the lockup clutch 22 may be slipped, as required.

Valve 86 also receives hydraulic fluid for lubrication along line 98 from a line pressure regulator 100, and this fluid is provided to the cooler 82 and/or line 94, as dictated by operation of the valve 86. Exhaust routes 102 are also provided at various places throughout the hydraulic control system 52 such that surplus hydraulic fluid can be routed back to the sump 48.

The line pressure regulator 100 receives hydraulic fluid at line pressure from pump 54 at two locations 116, 118 on either side of a piston 120. The surface areas on which the hydraulic fluid acts at locations 116 and 118 are different, the relative surface areas being tuned for suitable response by the piston 120 to changes in line pressure. The line pressure regulator 100 is also biased by spring 122 and has spaced outlets to lubrication line 98, suction line 55, and exhaust 102. The line pressure regulator 100 operates so that once suitable line pressure has been reached, surplus pressure is relieved firstly by allowing hydraulic fluid to flow along lubrication line 98 and, if necessary, by allowing hydraulic fluid to flow directly from line pressure regulator 100 back into suction line 55.

Hydraulic fluid is passed from the cooler 82 along line 104 to various points 106 for lubrication of the transmission 44.

Control between forward, neutral and reverse gears of the transmission 44 is performed by a manual valve 108 which is provided with hydraulic fluid at line pressure along line 110. Operation of this valve 108, controls supply of hydraulic fluid to control selection of forward, neutral and reverse gears of the transmission 44.

It is advantageous for watercraft be fitted with the decoupler 10, as described in detail above, as the provision of an additional forward speed enables the watercraft to be driven at a slow speed for manoeuvring as well as the ability to operate at high speeds, for example in open spaces. The provision of the first speed which utilises the planetary gear set 34 results in an increase in the amount of torque available to propel the watercraft from a standstill to a state in which it planes along a surface of, or propels through, the water. Such launching of a watercraft typically involves a lot of drag owing to a significant portion of the watercraft being submerged at standstill, and thus the availability of additional torque facilitates overcoming this drag for quickly bringing the watercraft into the planing state. Similarly, the availability of additional torque is also beneficial where the watercraft is used for high load conditions (ie. towing, loaded trawler) in which case there is the additional drag from the load source on the vessel. Where very slow speeds are required, for example in manoeuvring, there are two opportunities to reduce the vessel's speed, one by selecting a lower first gear and the other by the start-up clutch 20 which is able to be slipped by suitable control of the hydraulic control system 52 to prevent stalling of the motor.

It is also advantageous for the decoupler 10 to be used in conjunction with a diesel motor, as diesel motors generally have a lot of torque but a relatively narrow range of operating speeds. Accordingly, by using the decoupler 10 in combination with a diesel motor, the gear ratios may be selected to utilise the limited range of operating speeds of the diesel motor more effectively, to achieve a greater range of possible speeds of the watercraft.

FIG. 5 shows a system 124 in which the decoupler 10 is coupled to a six speed automatic transmission 126 which may be used, for example, in an automotive application. By coupling the decoupler 10 in combination with the six speed automatic transmission 126, the number of forward speeds of the transmission 126 is increased such that seven forward speeds are available. It is of course possible for the ratios of the two speeds offered by the decoupler to be chosen such that there are twelve speeds offered by the combined system 124, ie, the six speeds offered by the transmission 126 multiplied by the two speeds offered by the decoupler 10.

The upper half of FIG. 5 (above axis 128) shows a sectional view of the decoupler 10 as coupled to the transmission 126, whereas, beneath the axis 128, there is shown a sectional view of a torque converter coupled to the automatic transmission 126. The decoupler 10 and torque converter 130 have been depicted in this way to illustrate the compact nature of the decoupler 10, and in particular to illustrate that it may be substituted for an existing torque converter in front of a transmission, within a bell-housing of the transmission, without changing the location of the engine or transmission. This is beneficial as it is typically expensive to move the location of an engine and/or transmission in a vehicle, and would be disadvantageous to encroach upon internal space of the vehicle. Although FIG. 5 shows the decoupler 10 used in combination with a six speed automatic transmission, it should be noted that it is of course possible for the decoupler 10 to be used in combination with other transmissions.

In marine applications, it is foreseen that the gearing down ratio provided by the first gear of the decoupler could be different to that required for automobile applications. The ratio of the decoupler can be configured to be an overdrive or an underdrive. The decoupler 10 depicted in FIG. 1a has a neutral condition which is achievable by disengaging both the start-up clutch 20 and the lockup clutch 22.

Figure 6:
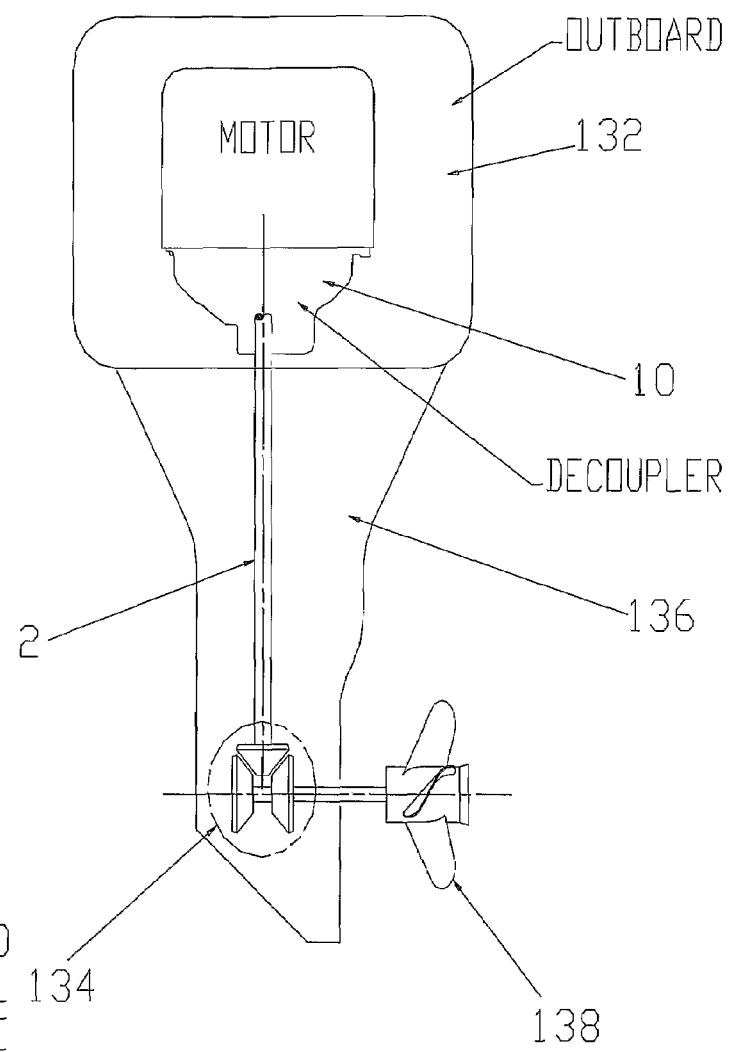
FIG. 6 is a diagrammatic sketch of an outboard motor for a watercraft which incorporates a drive decoupler.

The decoupler 10 may be used in outboard motor applications by incorporating the decoupler within the outboard motor 132 as shown in FIG. 6. In such an arrangement, the gears effecting engagement/disengagement of forward-neutral-reverse 134 may be located on the same shaft as a drive propeller 138.

Figure 7A:
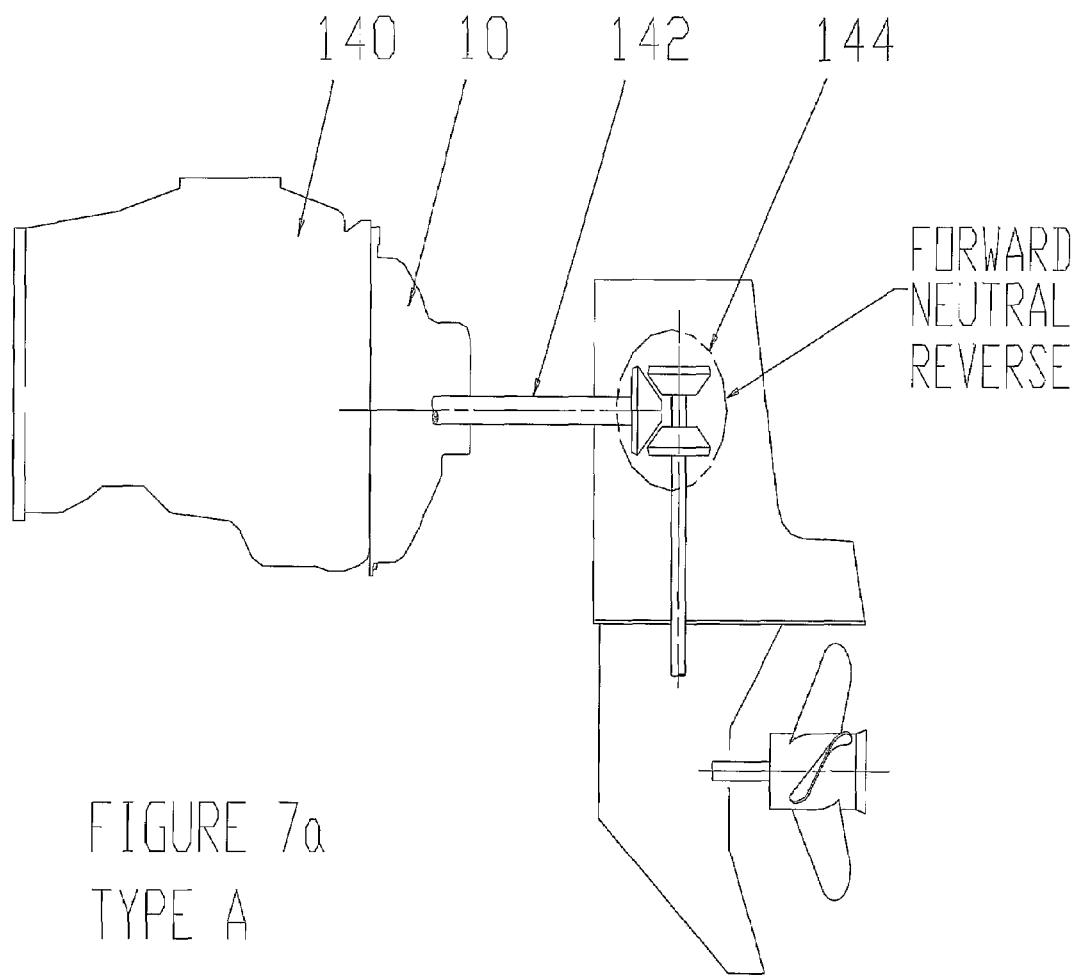
FIG. 7a is a diagrammatic sectional side view of a drive decoupler as used in a stem drive transmission, herein called type A, inboard motor arrangement for watercraft.
Figure 8:
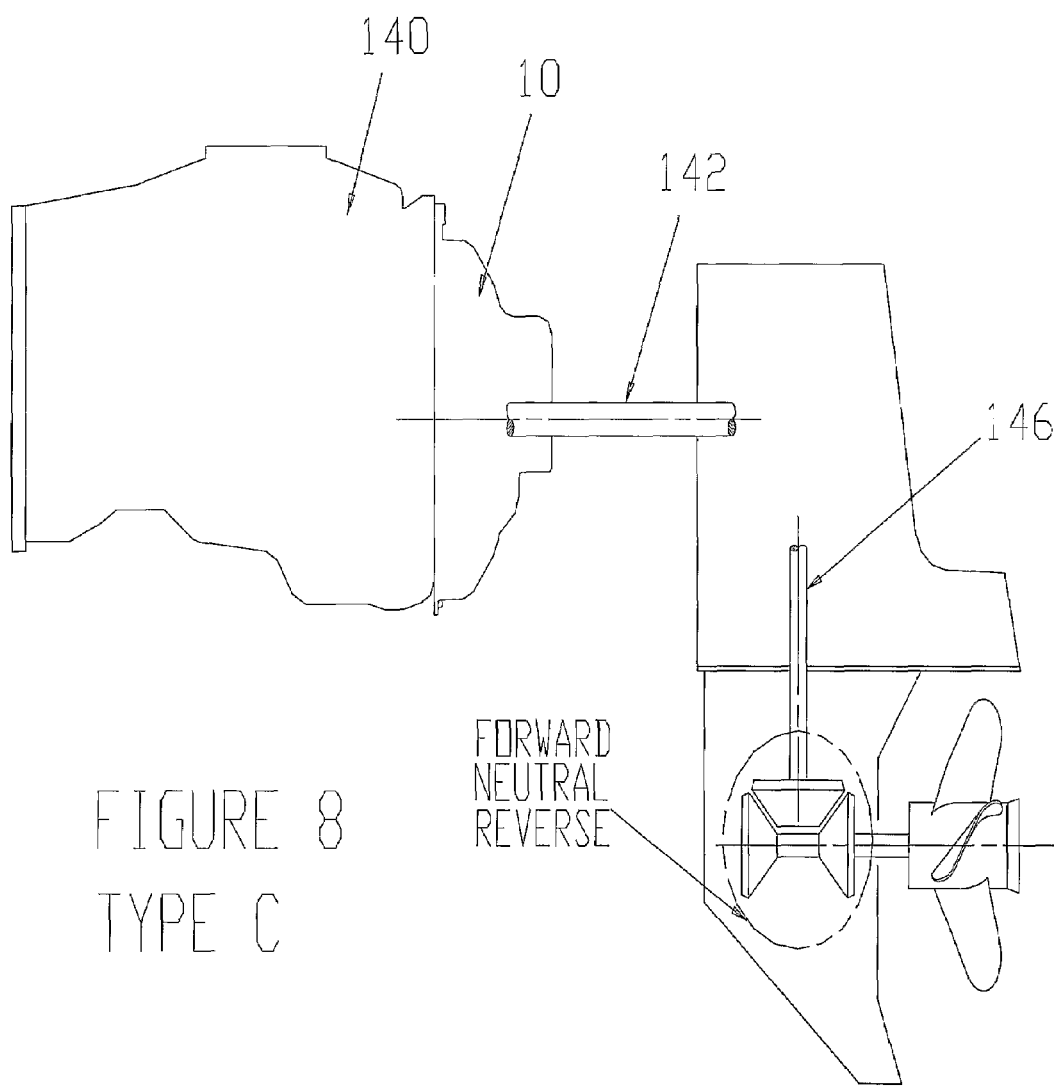
FIG. 8 is a diagrammatic sketch of a drive decoupler as used in a stem drive transmission, herein called type C, inboard motor arrangement for watercraft.

The decoupler 10 may also be used with an inboard motor of a watercraft, by attaching the decoupler 10 relative to the inboard motor 140 as shown in FIGS. 7 and 8. More particularly, FIG. 7a shows an arrangement wherein the decoupler 10 is attached to the rear of engine 140, and wherein a drive shaft 142 extends rearwardly from the decoupler 10 to a bevel gear set 144 which is used to control forward-neutral-reverse engagement/disengagement of the drive system. Similarly, in FIG. 7b there is shown an arrangement wherein a decoupler 10 is attached to the rear of motor 140, with drive shaft 142 extending outwardly from decoupler 10 to a bevel gear set 144 used to effect forward-neutral-reverse engagement/disengagement of the drive system. The system shown in FIG. 7b incorporates two propellers which are powered by the motor 140, and are contra-rotating.

FIG. 8 shows a decoupler 10 in a marine application similar to that shown in FIG. 7a in that the decoupler is mounted to the rear of an inboard engine 140, except with the bevel gears for effecting forward-neutral-reverse selection being located on the same shaft as the drive propeller.

Figure 9:
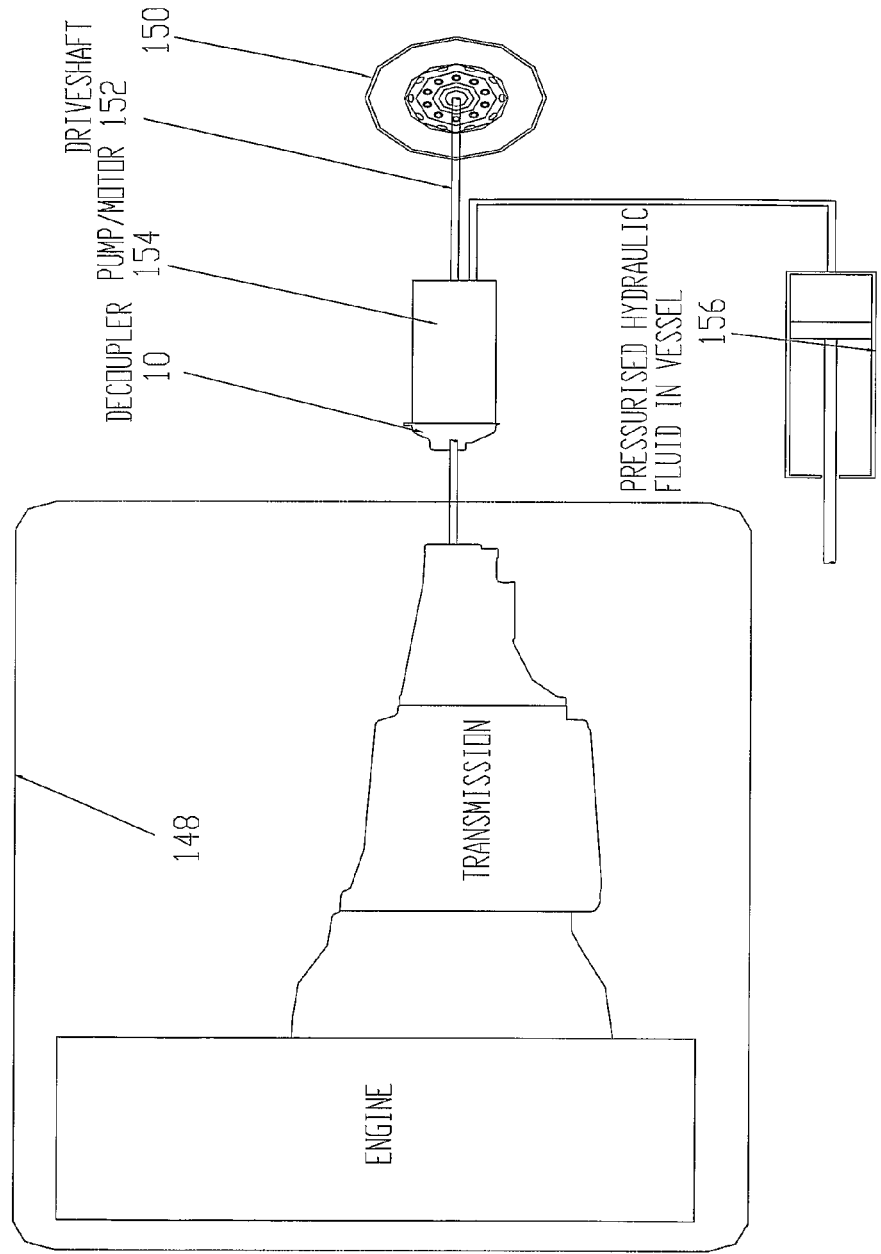
FIG. 9 is a diagrammatic sketch of a drive decoupler as used in a hydraulic hybrid system.

Another application in which the decoupler 10 may be used is a Hydraulic Hybrid system, as shown in FIG. 9, wherein an engine and transmission 148 are coupled to driving wheels 150 of a vehicle, via drive shaft 152. The drive shaft 152 rotates a pump 154 which pumps hydraulic fluid into a pressure vessel 156 such that energy, for example from regenerative braking of the vehicle, is able to be stored in the form of pressurised hydraulic fluid in the vessel 156. There exists a problem with existing hydraulic hybrid drive systems in that the pump 154 is subject to overspeeding at high drive shaft speeds. By incorporating a decoupler 10 between the engine and pump 154, as shown in FIG. 9, it is possible to regulate the speed of rotation of the pump 154 by using the different speeds of the decoupler 10 to avoid overspeeding. It is also possible to decouple the pump 154 from engine drive by disengagement of both the start-up clutch 20 and lockup clutch 22 so that the engine and transmission 148 may be decoupled from the pump 154. It may be particularly advantageous to decouple the engine and transmission 148 from the pump 154 when the energy stored in vessel 156 is to be used to power the vehicle by using the pump 154 as a hydraulically driven motor. Accordingly, the engine and transmission may be switched off when the vehicle is driven from the energy stored in vessel 156 such that the vehicle is able to operate without noise or fuel consumption associated with the engine and transmission 148.

Figure 10:
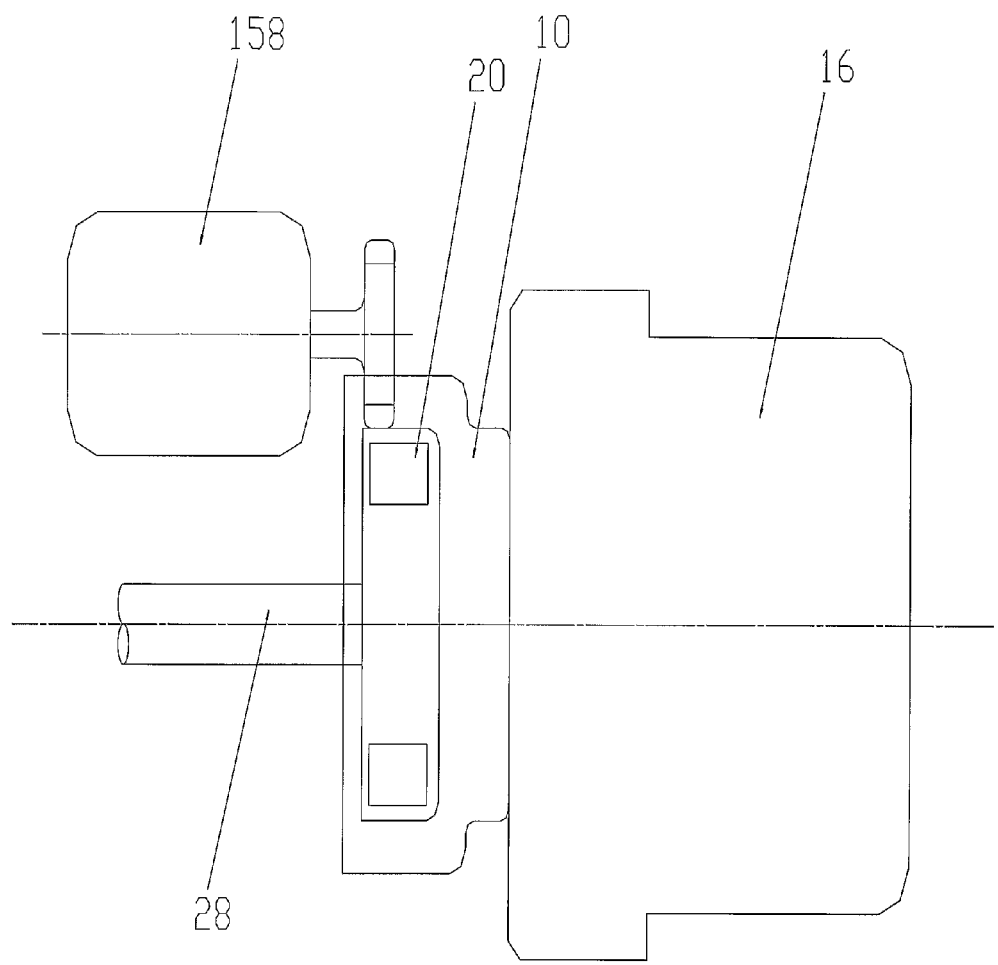
FIG. 10 is a diagrammatic sectional side view of a drive decoupler as used in an electric hybrid system.

Yet another form of drive system in which the decoupler 10 may be used is an Electric Hybrid system as shown in FIG. 10. In this configuration, both an internal combustion engine (not shown) and an electric motor (or other power source, maybe hydraulic) 158 are able to be selectively coupled to the output drive 28 via the decoupler 10. More particularly, the internal combustion engine is coupled to the output drive 28 via engine damper 16 and the electric motor (or other power source) 158 is coupled to the drive shaft 28 via clutch 20, and a planetary gear set (not shown). As such, the output shaft 28 may be driven by the internal combustion engine alone by disengaging clutch 20 so that the electric motor (or other power source) 158 is not coupled to the output drive 28. Alternatively, clutch 20 may be engaged such that the output shaft 28 is driven by both the engine and the electric motor (or other power source) 158. In this arrangement, the electric motor (or other power source) 158 may also be used as a starter motor for starting the engine. The electric motor (or other power source) 158 may also be used to drive the output shaft 28 with the engine decoupled from the output shaft 28, for example in applications where the electric motor (or other power source) results in greater efficiency than the engine, such as in powering a vehicle in heavy traffic. Where the output of the system is held stationary, for example when the decoupler 10 is used in a vehicle stopped in traffic, if the internal combustion engine is running, the engine is able to be used to rotate the electric motor (or other power source) 158 which is able to operate as a charger such that the rotational energy from the idling internal combustion engine is able to be stored, for example in batteries. The electric motor (or other power source) 158 is also able to operate as a charger during braking of the vehicle such that kinetic energy of the vehicle is able to be transferred into energy stored in batteries.

However, in the above system the electric motor cannot drive the vehicle alone as it needs the reaction of the engine. Inclusion of a one way clutch to ground the carrier allows the electric motor to drive the vehicle when the engine is not driving. When the engine also drives, the one way clutch is overdriven.

Figure 11:
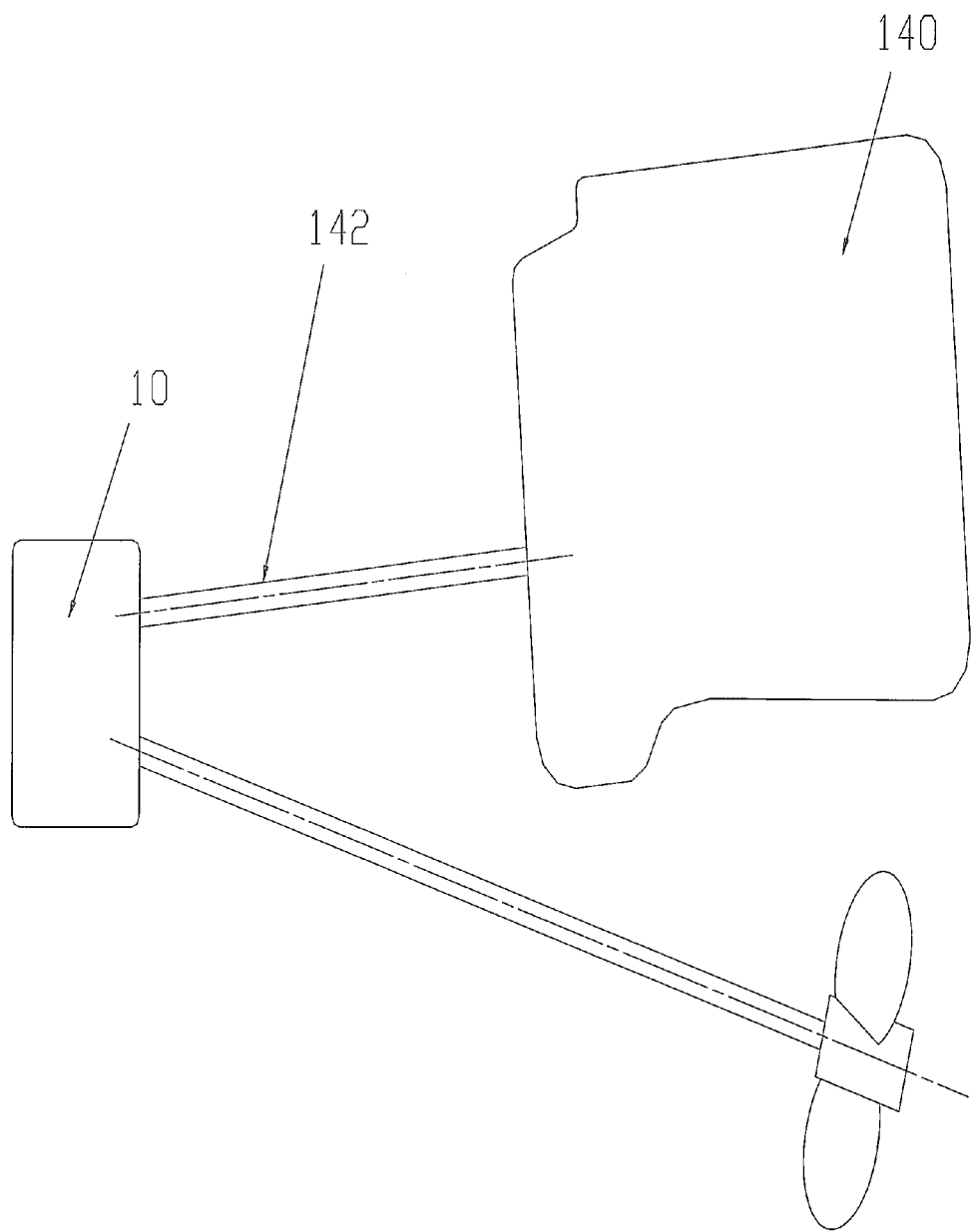
FIG. 11 is a diagrammatic sectional side view of a drive decoupler as used in a V-drive system.

FIG. 11 shows an example of a decoupler 10 used in a V-drive system of a watercraft, wherein the decoupler 10 is located for transmitting drive between a drive shaft 142 driven by an engine 140, and a shaft to which a drive propeller is mounted.

Figure 12:
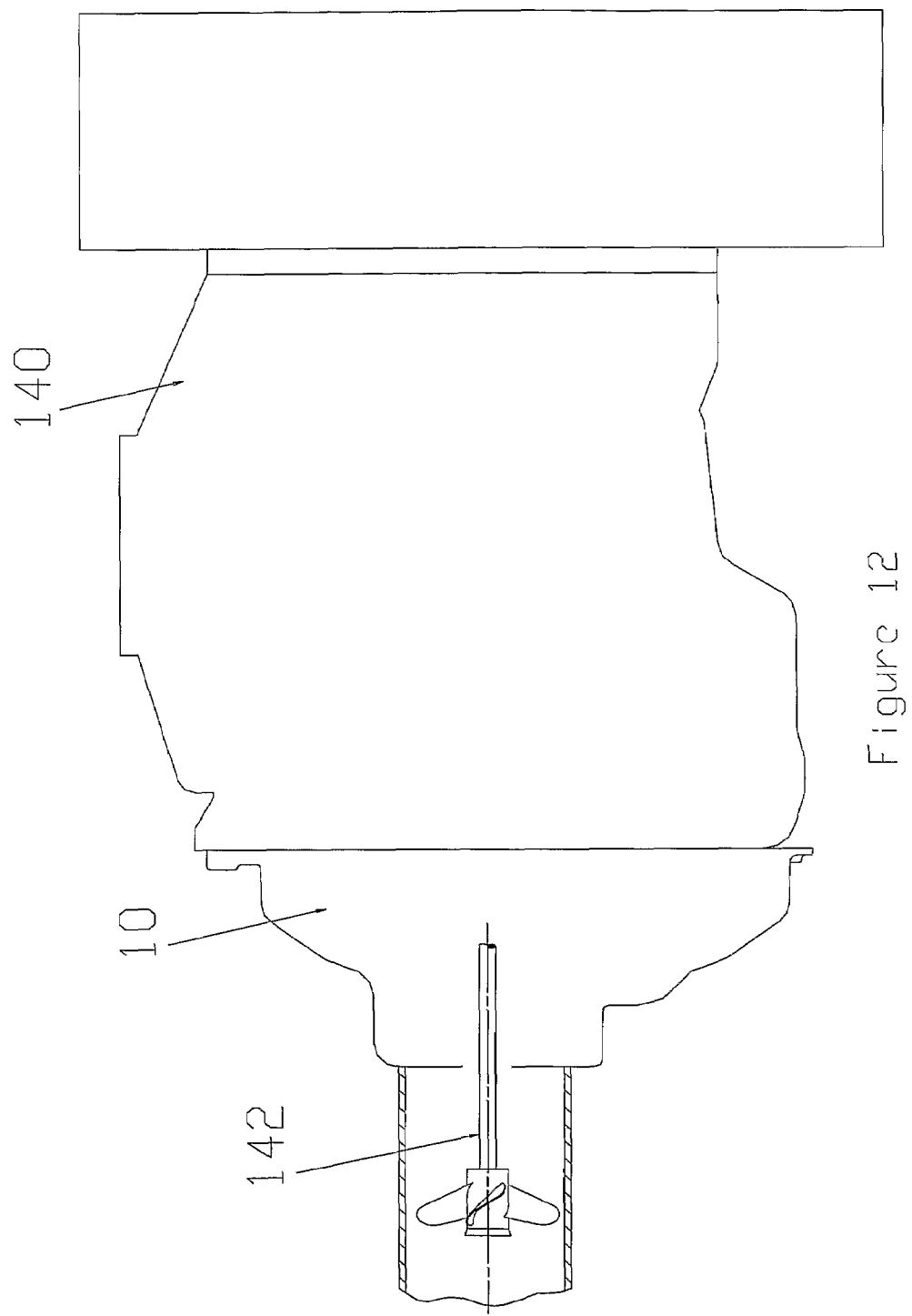
FIG. 12 is a diagrammatic sectional side view of a drive decoupler as used in a shaft, jet or surface drive system.

FIG. 12 shows an example of another system using a decoupler 10, in which the decoupler 10 is fitted to the rear of an engine 140 such that the decoupler 10 transmits drive from the engine 140 to a drive shaft 142 on which a propeller is mounted. Such an arrangement can be used, for example, in a jet drive system.

In the systems described above, the decoupler 10 is preferably able to use CAN (Control Area Network) networking such that the control of the decoupler 10 is able to share information with the control systems of other components, such as the engine and transmission. Accordingly, information required by the control system of the decoupler 10, such as would be provided by (for example) an input speed sensor providing the control system with information regarding the speed of the front shell portion 12 of the decoupler 10, could instead be provided by (for example) the control system of the engine such that the need for the input speed sensor is obviated. An example of a CAN (Control Area Network) incorporating the decoupler is shown diagrammatically in the block diagram of FIG. 13.

The above decoupler and the systems incorporating same have been described by way of example only and modifications are possible within the scope of the invention. For example, in another examples the gear set of the drive decoupler may include an additional output gear and an associated additional clutch for providing a different drive ratio.

The claims defining the invention are as follows:

1. A decoupler configured for transmitting drive between the engine of a vehicle and a drivetrain of the vehicle, wherein the decoupler has a housing adapted for coupling to a rotatable output of the engine, an output member adapted for coupling to the drivetrain, an input part coupled directly to the housing by a damper, a first clutch engageable between the input part and a planetary gear set for transmitting drive from the input part to the output member at a first ratio, and a second clutch engageable between the input part and the output member for transmitting drive from the input part to the output member at a second ratio.

2. A decoupler as claimed in claim 1, wherein the clutches are concentric with the planetary gear set and operable to selectively isolate the output member from driving connection with the engine.

3. A decoupler as claimed in claim 1, wherein the housing and the output member are rotatable about a common axis.

4. A decoupler as claimed in claim 1, wherein the first ratio is lower than 1:1.

5. A decoupler as claimed in claim 1, wherein the decoupler is adapted for transmitting drive from an electric motor to the output member at one ratio and from transmitting drive from an internal combustion engine to the output member at another ratio.

6. A decoupler as claimed in claim 5, wherein the electric motor is operable as a generator for generating charge in response to rotational input to the decoupler.

7. A decoupler as claimed in claim 6, wherein the charge is fed to an energy storage device.

8. A decoupler as claimed in claim 6, wherein the rotational input to the decoupler is from kinetic energy of the vehicle such that the electric motor provides regenerative braking to the vehicle.

9. A decoupler as claimed in claim 6, wherein the rotational input to the decoupler is from the internal combustion engine.

10. A decoupler as claimed in claim 1, wherein both clutches are capable of slipping, and wherein in changing between the first and second ratios engagement of one clutch via a slipping condition is coordinated with disengagement of the other clutch, such that one clutch is at least partially engaged before the other clutch is fully disengaged.

11. A decoupler as claimed in claim 1, wherein the decoupler includes a one-way clutch to enable relative rotation between the output member and the planetary gear set when both clutches are engaged.

12. A method of operating a decoupler as claimed in claim 1, including the step of controlling clutch slippage to enable the engine to reach an engine speed corresponding to high-torque before one or both clutches is/are fully engaged so as to obtain high-torque output.

13. A decoupler having shell portions for housing a gear set, a rotatable input member for coupling to a drive unit and a rotatable output member for coupling to an output drive, the gear set being for transmitting drive from the rotatable input member to the rotatable output member, wherein the decoupler is operable to selectively isolate an input gear of the gear set from driving connection with the drive unit, and to selectively engage the input gear into driving connection with the drive unit, and wherein the input member forms one of the shell portions of the decoupler;

wherein the gear set provides a plurality of drive ratios between the input member and the output member, wherein the gear set is a planetary gearset providing a first drive ratio higher than 1:1 and a second drive ratio of 1:1, or a first drive ratio of 1:1 and a second drive ratio of less than 1:1, wherein the decoupler includes a second input gear and associated second clutch for driving the output drive at the second drive ratio, wherein both clutches are capable of slipping, and wherein in changing between the first and second ratios engagement of one clutch via a slipping condition is coordinated with disengagement of the other clutch, such that one clutch is at least partially engaged before the other clutch is fully disengaged.

* * * * *